United States Patent
Gebhart et al.

(10) Patent No.: US 7,603,404 B2
(45) Date of Patent: Oct. 13, 2009

(54) GRID PARALLEL EXECUTION

(75) Inventors: Alexander Gebhart, Bad Schoenborn (DE); Erol Bozak, Pforzheim (DE)

(73) Assignee: SAP AG, Walldorf (DE)

( * ) Notice: Subject to any disclaimer, the term of this patent is extended or adjusted under 35 U.S.C. 154(b) by 928 days.

(21) Appl. No.: 11/017,291

(22) Filed: Dec. 20, 2004

(65) Prior Publication Data

US 2006/0136883 A1 Jun. 22, 2006

(51) Int. Cl.
*G06F 15/16* (2006.01)
*G06F 15/173* (2006.01)

(52) U.S. Cl. .................... 709/201; 709/223

(58) Field of Classification Search ........... 709/201, 709/228, 239, 223; 717/127, 131
See application file for complete search history.

(56) References Cited

U.S. PATENT DOCUMENTS

| | | | | |
|---|---|---|---|---|
| 5,361,334 A | * | 11/1994 | Cawley | 709/243 |
| 5,835,765 A | * | 11/1998 | Matsumoto | 718/102 |
| 6,272,548 B1 | * | 8/2001 | Cotter et al. | 709/239 |
| 6,779,028 B1 | * | 8/2004 | Nakamura | 709/223 |
| 6,910,210 B1 | * | 6/2005 | Chew | 718/103 |
| 7,082,555 B2 | * | 7/2006 | Toyooka et al. | 714/48 |
| 7,213,176 B2 | * | 5/2007 | Banko | 714/38 |
| 7,406,686 B2 | * | 7/2008 | Liu et al. | 717/151 |
| 2005/0213837 A1 | * | 9/2005 | Boykov et al. | 382/253 |
| 2005/0262506 A1 | * | 11/2005 | Dawson et al. | 718/100 |
| 2006/0031537 A1 | * | 2/2006 | Boutboul et al. | 709/228 |

OTHER PUBLICATIONS

European Search Report dated Feb. 24, 2006 pertaining to Application No. 05027543.7-2211.
Li et al., "Improving Performance via Computational Replication on a Large-Scale Computational Grid," Cluster Computing and the Grid, 2003., Proceedings, CCGRID 2003, $3^{rd}$ IEEE/ACM International Symposium May 12-15, 2003, pp. 442-448.
Ali et al., "Predicting the Resource Requirements of a Job Submission," Computing in High Energy Physics, Sep. 27, 2004, pp. 1-4.
Berstis, "Fundamentals of Grid Computing," IBM Redbooks, Nov. 11, 2002, pp. 1-24.

\* cited by examiner

*Primary Examiner*—William C. Vaughn, Jr.
*Assistant Examiner*—Kristie D Shingles

(57) ABSTRACT

A method includes, in a grid network, maintaining a store containing a history of specific application executions, maintaining a list of grid applications in parallel, executing an application capable of executing in parallel on one or more grid compute nodes contained in the list, terminating execution of the application on the one or more grid compute nodes upon a successful completion of the application in any of the one or more grid compute nodes, and transmitting a result to a client.

9 Claims, 3 Drawing Sheets

GRID PARALLEL EXECUTION

TECHNICAL FIELD

The present invention relates to data processing by digital computer, and more particularly to grid parallel execution.

BACKGROUND

Grid computing is a form of distributed system wherein computing resources are shared across networks. Grid computing enables the selection, aggregation, and sharing of information resources resident in multiple administrative domains and across geographic areas. These information resources are shared, for example, based upon their availability, capability, and cost, as well as a user's quality of service (QoS) requirements. Grid computing can mean reduced cost of ownership, aggregated and improved efficiency of computing, data, and storage resources, and enablement of the creation of virtual organizations for applications and data sharing.

SUMMARY

The present invention provides methods and apparatus, including computer program products, for grid parallel execution.

In one aspect, the invention features a method including, in a grid network, maintaining a database containing a history of specific grid-enabled application executions, maintaining a list of grid compute nodes capable of executing the specific grid-enabled applications in parallel, executing a grid-enabled application in parallel on one or more grid compute nodes contained in the list, and terminating execution of the grid-enabled application on the one or more grid compute nodes upon a successful completion of the grid-enabled application in any of the one or more grid compute nodes.

In embodiments, the history can include information affecting an execution of specific applications on specific grid compute nodes. The information can include failure rate information of an execution of the specific applications on the specific grid compute nodes. The list can include a flag indicating whether a specific application can execute on a specific grid compute node.

In another aspect, the invention features a method including, in a grid network, receiving a request to execute an application, determining if the requested application can be executed on multiple grid compute nodes in parallel, and in response to determining, executing the requested application on the multiple grid compute nodes.

In embodiments, the method can include determining when the requested application successfully completes on one of the multiple grid compute nodes, and in response to determining, terminating the execution of the requested application on the remaining multiple grid compute nodes.

Determining can include performing a lookup of the application in a database, the database containing information pertaining to the requested application and the multiple grid compute nodes. The information can include a flag representing whether the requested application can be executed in parallel. The information can include statistical information related to execution of the requested application on grid compute nodes capable of executing the application.

Determining can include checking whether a flag associated with the requested application can be set or cleared.

Embodiments of the invention may have one or more of the following advantages.

Once the list is in place, a potential risk to run an application in a grid environment can be assessed by a grid manager or similar grid component. If an application executes in a grid network and the user-customizable risk potential exceeds a certain threshold, the grid manager can delegate the request to execute the application in parallel grid compute nodes.

The list indicates whether an application can be executed in parallel. If the application cannot be executed in parallel, it is executed on one grid compute node. If the application can be executed in parallel, the application is initiated in multiple grid compute nodes simultaneously.

As soon as one application completes successfully, the parallel execution in the remaining grid compute nodes is terminated.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
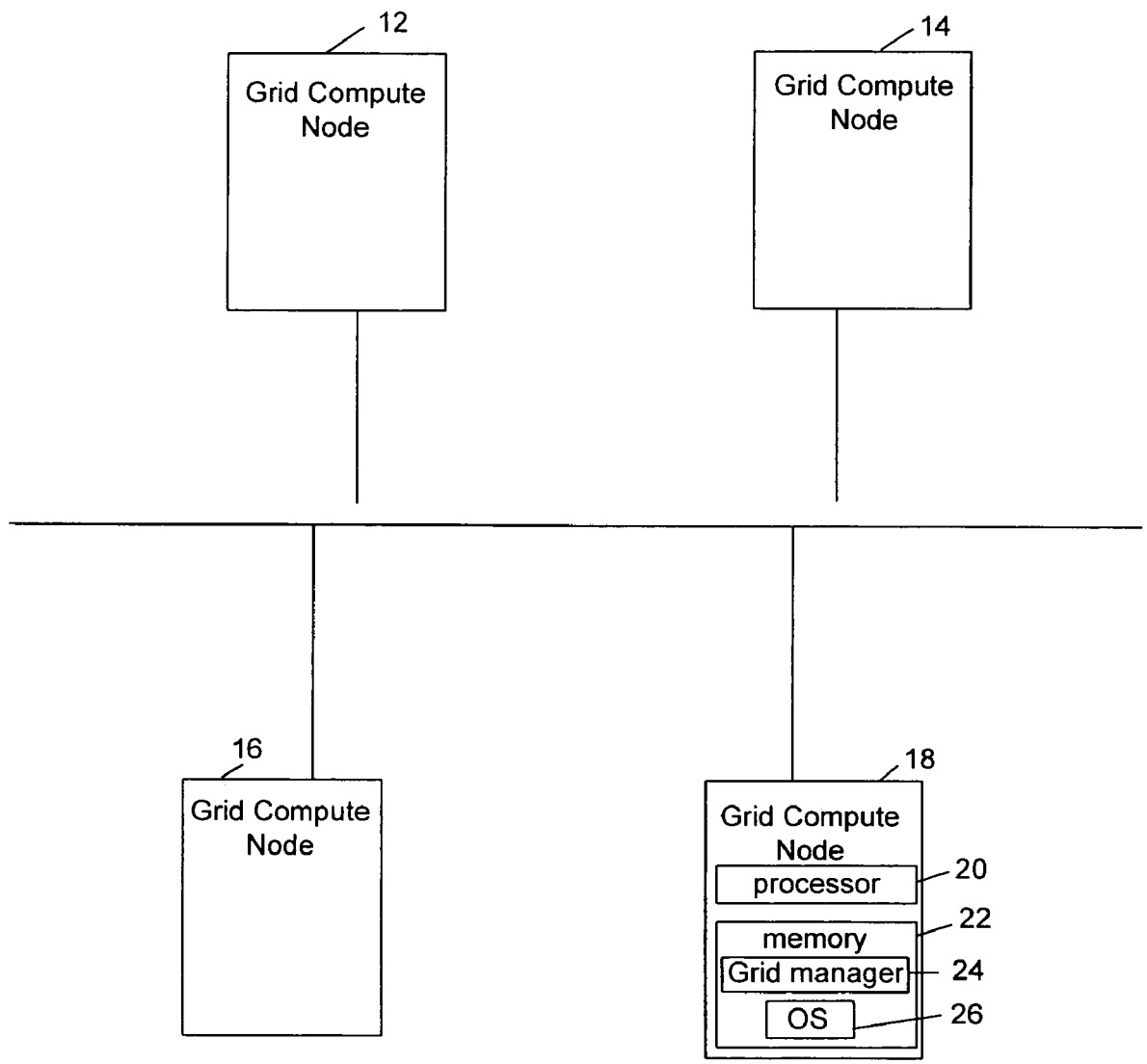
FIG. 1 is block diagram.
Figure 2:
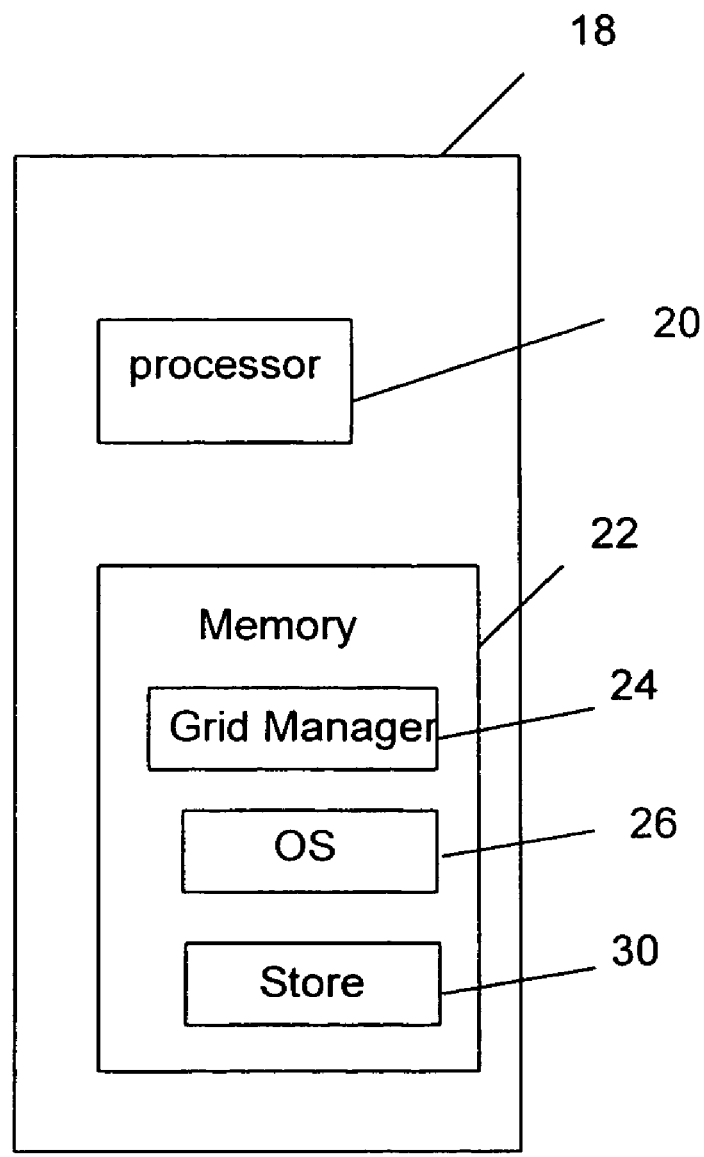
FIG. 2 is a block diagram.

As shown in FIG. 1, a grid network 10 in accordance with one embodiment of the invention includes a number of interconnected grid compute nodes 12, 14, 16, 18. In a particular example, the grid network 10 is implemented as a client-server network. Client/server describes a relationship between two computer programs in which one program, the client, makes a service request from another program, the server, which fulfills the request. Although the client/server idea can be used by programs within a single computer, it is a more important idea in a network, such at network 10. In a network, the client/server model provides a convenient way to interconnect programs that are distributed efficiently across different locations.

In the client/server model, one server, sometimes called a daemon, is activated and awaits client requests. Typically, multiple client programs share the services of a common server program. Both client programs and server programs are often part of a larger program or application. Relative to the Internet, a Web browser is a client program that requests services from a Web server in another computer somewhere on the Internet.

Each of the grid compute nodes, grid compute node 18, for example, can include a processor 20 and a memory 22. Memory 22 includes a grid manager 24 and an operating system (OS) 26, such as Unix, Linux or Windows.

In this particular example, each of the grid compute nodes 12, 14, 16, and 18 include grid-enabled applications capable of executing in response to a request to perform a specific task. In other examples, the applications are not stored on the grid nodes. Deployment of software just prior to execution is provided.

In response to a request to execute an application to perform a specific task, some applications can be executed simultaneously in parallel on more than one grid compute node. For example, an application can be run in parallel on multiple grid compute nodes if the application does not read and/or write data to a specific database during execution. If the application can be executed in parallel, the application can take advantage of different grid compute nodes 12, 14, 16, 18 and results generated by one grid compute node can cause the termination of application execution in other grid compute nodes.

A failure and success history can be stored in a central location (e.g. using a superior grid manager) or decentrally on each node (e.g.) using a inferior grid manager). The information itself can be stored, for example, in a database, in a file system, in a memory, and so forth.

In one particular example, a store 30 lists how many times each grid-enabled application failed or succeeded to run in a grid environment such as grid network 10. In a particular example, the store 30 lists an indication of how severe a failure was during application execution, e.g., if a grid compute node needed a reboot after application execution failure or if a grid compute node needed a new hard disk image after application execution failure. The list 30 also includes an application indicator, such as a flag, which indicates which grid-enabled application can run on different grid compute nodes simultaneously with the same task.

The store 30 also lists an indication of whether a specific grid-enabled application can be executed in parallel on more than one grid compute node. In a particular example, the indication of whether a grid-enabled application can be executed in parallel is statically predetermined. In another particular example, the indication of whether a grid-enabled application can be executed in parallel is dynamically determined, e.g., using a common protocol to require information directly from a specific grid-enabled application itself.

The list 30 allows a grid manager, e.g., grid manager 24, to assess a potential risk of a specific grid-enabled application running in the grid network 10. If grid-enabled application is designated to run in the grid network 10 and a risk of failure exceeds a user-customizable threshold, the grid manager 24 can delegate a request to execute the grid-enabled application to more than one grid compute node in the grid network 10 in parallel.

If a particular grid-enabled application begins execution in parallel in more than one grid compute node, as soon as one grid compute node successfully completes execution of the grid-enabled application it sends an application termination signal to the remaining grid compute nodes that are executing the grid-enabled application. The remaining grid compute nodes terminate execution of the grid-enabled application upon receipt of the application termination signal.

Figure 3:
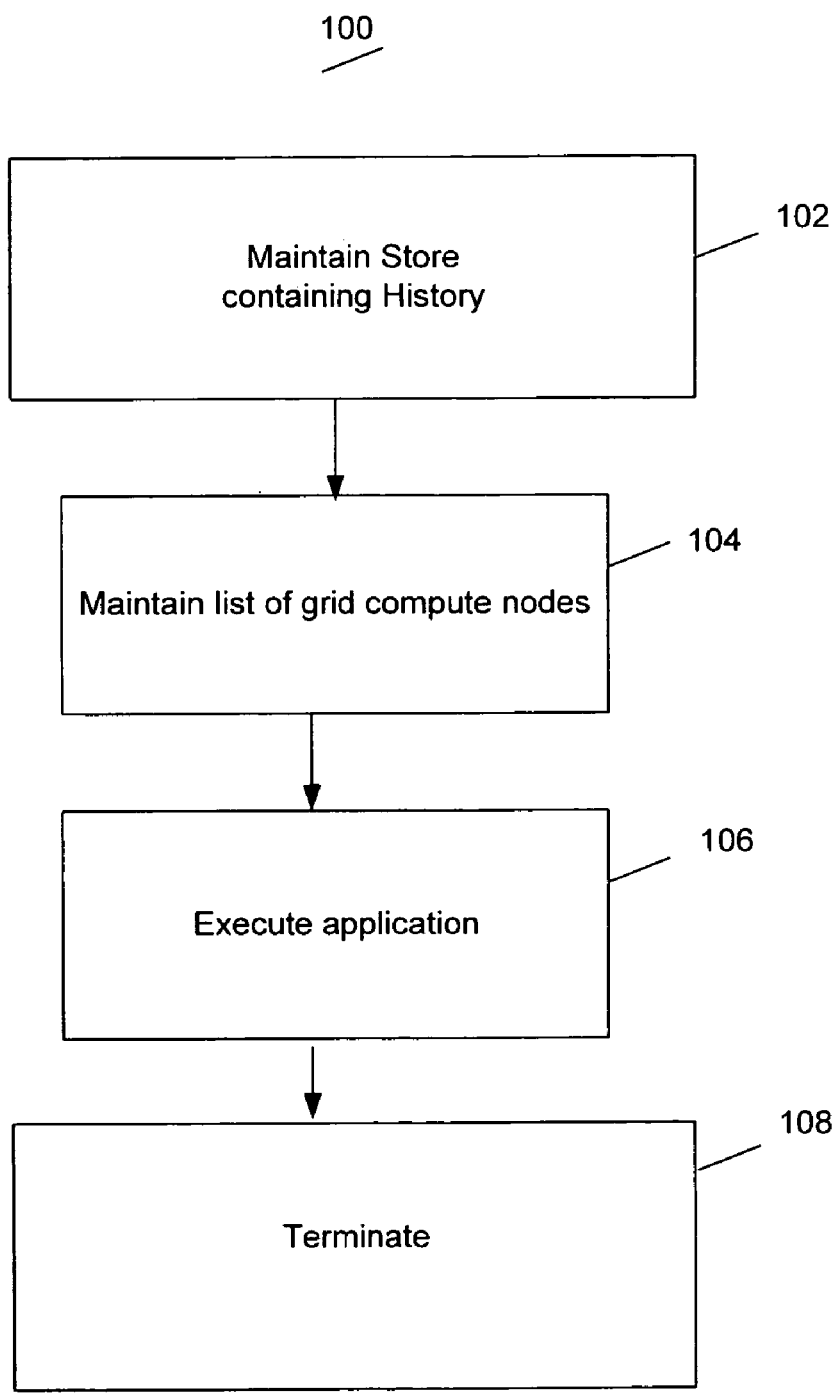
FIG. 3 is a flow diagram.
Like reference symbols in the various drawings indicate like elements

As shown in FIG. 3, a grid parallel execution process 100 includes, in a grid network, maintaining (102) a store containing a history of specific grid-enabled applications and their executions. The store also includes whether a particular grid-enabled application can be executed in parallel or not. The history can include information affecting an execution of specific grid-enabled applications on specific grid compute nodes. In a particular example, the information can include failure rate information of an execution of the specific grid-enabled applications on specific grid compute nodes. In another particular example, the information can include statistical information related to execution of the requested grid-enabled application on grid compute nodes capable of executing the grid-enabled application.

Process 100 maintains (104) a list of grid compute nodes in the grid network capable of executing the grid-enabled application. In a particular example, the list includes a flag indicating whether a specific grid-enabled application can execute on a specific grid compute node.

Process 100 executes (106) a grid-enabled application (that is capable of being executed in parallel) on one or more grid compute nodes contained in the list. Process 100 terminates (108) execution of the grid-enabled application on the one or more grid compute nodes upon a successful completion of the grid-enabled application in any of the one or more grid compute nodes.

Process 100 transmits (110) a result to a client.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD☐ROM and DVD-ROM disks. The processor and the memory can be supplemented by, or incorporated in special purpose logic circuitry.

The invention has been described in terms of particular embodiments. Other embodiments are within the scope of the following claims. For example, the steps of the invention can be performed in a different order and still achieve desirable results.

The invention claimed is:

1. A method for facilitating execution of applications in a grid network comprising a plurality of grid compute nodes, the method comprising:

maintaining in the grid network a store including at least:

a failure and success history of execution of specific grid-enabled applications, the history including rate of failure information of execution of the grid-enabled applications on selected grid compute nodes and an indication of how severe any failures are during the execution;

a list of grid-enabled applications capable of executing simultaneously on multiple grid compute nodes; and
a list of grid compute nodes that are capable of executing the grid-enabled applications;
determining, by a processor connected to the store and based on information in the store, if a requested grid-enabled application can be executed on multiple grid compute nodes simultaneously;
determining, by the processor and based on the history, a potential risk of failure of executing the requested grid-enabled application on the grid network;
if it is determined by the processor that the requested grid-enabled application can be executed on multiple grid compute nodes simultaneously and that the potential risk of failure exceeds a threshold, then initiating, by the processor, execution of the requested grid-enabled application simultaneously on multiple grid compute nodes in the grid network;
instructing, by the processor, termination of execution of the requested grid-enabled application on the multiple grid compute nodes upon a successful completion of execution the requested grid-enabled application in any of the multiple grid compute nodes; and
providing, by the processor to a client, a result associated with the successful completion of execution of the requested grid-enabled application.

2. The method of claim 1 wherein the list of grid-enabled applications includes flags indicating whether the grid-enabled applications can be executed on respective grid compute nodes.

3. The method of claim 1 wherein the list of applications includes a flag representing whether the requested grid-enabled application can be executed simultaneously on multiple grid compute nodes.

4. The method of claim 1 wherein the history includes statistical information related to execution of the requested grid-enabled application on the grid compute nodes.

5. The method of claim 1 wherein determining if a requested grid-enabled application can be executed on multiple grid compute nodes simultaneously comprises checking whether a flag associated with the requested grid-enabled application is set or cleared.

6. A computer-readable storage medium, tangibly embodied, storing a computer program which, when executed by a data processing apparatus, causes the data processing apparatus to perform a method for parallel execution of applications in a grid network comprising a plurality of grid compute nodes, the method comprising:
maintaining a store including at least:
a failure and success history of execution of specific grid-enabled applications, the history including rate of failure information of execution of the grid-enabled applications on selected grid compute nodes and an indication of how severe any failures are during the execution;
a list of grid-enabled applications capable of executing simultaneously on multiple grid compute nodes; and
a list of grid compute nodes that are capable of executing the grid-enabled applications;
determining, based on information in the store, if a requested grid-enabled application can be executed on multiple grid compute nodes simultaneously;
determining, based on the history, a potential risk of failure of executing the requested grid application on the grid network;
if it is determined that the requested grid-enabled application can be executed on multiple grid compute nodes simultaneously and that the potential risk of failure exceeds a user-customizable threshold, then initiating execution of the requested grid-enabled application simultaneously on multiple grid compute nodes in the grid network;
instructing termination of execution of the requested grid-enabled application on the multiple grid compute nodes upon the successful completion of execution of the requested grid-enabled application in any of the multiple grid compute nodes; and
delivering to a client a result associated with the successful completion of execution of the requested grid-enabled application.

7. The computer-readable storage medium of claim 6 wherein the list of applications comprises a flag indicating whether the grid-enabled applications can execute on respective grid compute nodes.

8. A grid computing system for facilitating execution of applications in a grid compute network comprising a plurality of grid compute nodes, the system comprising:
means for maintaining a database including at least:
a failure and success history of execution of specific grid-enabled applications, the history including rate of failure information of execution of the grid-enabled applications on selected grid compute nodes in the grid network and an indication of how severe any failures are during the execution;
a list of grid-enabled applications capable of executing simultaneously on multiple grid compute nodes; and
a list of grid compute nodes that are capable of executing the grid-enabled applications;
means for determining, based on information in the database, if a requested grid-enabled application can be executed on multiple grid compute nodes simultaneously;
means for determining, based on this history, a potential risk of failure of executing the requested grid-enabled application on the grid network;
means for, if it is determined that the requested grid-enabled application can be executed on multiple grid compute nodes simultaneously and that the potential risk of failure exceeds a user-customizable threshold, then initiating execution of the requested grid-enabled application simultaneously on multiple grid compute nodes in the grid network;
means for instructing termination of execution of the requested grid-enabled application on the multiple grid compute nodes upon the successful completion of execution of the requested grid-enabled application in any of the multiple grid compute nodes; and
means for providing to a client a result associated the successful completion of execution of the requested grid-enabled application.

9. The system of claim 8 wherein the list of applications includes flags indicating whether the the grid-enabled applications can execute on respective grid compute nodes.

* * * * *

UNITED STATES PATENT AND TRADEMARK OFFICE
CERTIFICATE OF CORRECTION

PATENT NO.        : 7,603,404 B2                                             Page 1 of 1
APPLICATION NO.   : 11/017291
DATED             : October 13, 2009
INVENTOR(S)       : Gebhart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1161 days.

Signed and Sealed this

Fifth Day of October, 2010

David J. Kappos
*Director of the United States Patent and Trademark Office*